US011970315B2

(12) United States Patent
Haglof et al.

(10) Patent No.: US 11,970,315 B2
(45) Date of Patent: Apr. 30, 2024

(54) VISCOUS CONSTRUCTION MATERIAL TUBE CAP AND STRAPPING APPARATUS

(71) Applicants: Joshua Haglof, Sagamore Beach, MA (US); Nicholas Haglof, Sagamore Beach, MA (US); Philip David Haglof, Sagamore Beach, MA (US)

(72) Inventors: Joshua Haglof, Sagamore Beach, MA (US); Nicholas Haglof, Sagamore Beach, MA (US); Philip David Haglof, Sagamore Beach, MA (US)

(73) Assignees: Joshua Haglof, Sagamore Beach, MA (US); Nicholas Haglof, Sagamore Beach, MA (US); Philip Haglof, Sagamore Beach, MA (US)

( * ) Notice: Subject to any disclaimer, the term of this patent is extended or adjusted under 35 U.S.C. 154(b) by 93 days.

(21) Appl. No.: 17/152,859

(22) Filed: Jan. 20, 2021

(65) Prior Publication Data

US 2021/0229878 A1 Jul. 29, 2021

Related U.S. Application Data

(60) Provisional application No. 62/965,478, filed on Jan. 24, 2020.

(51) Int. Cl.
*B65D 55/16* (2006.01)
*B05C 17/005* (2006.01)
(Continued)

(52) U.S. Cl.
CPC ........ *B65D 47/141* (2013.01); *B05C 17/0052* (2013.01); *B65D 47/121* (2013.01)

(58) Field of Classification Search
CPC .......... B05C 17/0052; B05C 17/00596; B05C 17/00516; B05C 17/00503;
(Continued)

(56) References Cited

U.S. PATENT DOCUMENTS 1,999,598 A 4/1935 Levine
2,117,407 A * 5/1938 Davis .................. B65D 41/045 222/546
(Continued)

FOREIGN PATENT DOCUMENTS

DE 3815641 A1 11/1989
EP 1247746 A1 10/2002
(Continued)

*Primary Examiner* — Charles P. Cheyney
(74) *Attorney, Agent, or Firm* — Rauschenbach Patent Law Group, PLLC; Kurt Rauschenbach

(57) ABSTRACT

A viscous construction material tube cap and strapping apparatus includes an elastic strap. A construction material tube cap has dimension chosen to fit over a nozzle of a construction material tube, where the construction material tube cap defines a plurality of apertures having dimensions for passing the elastic strap. A base is dimensioned to fit over a bottom of the construction material tube. The base includes an air seal that substantially prevents air from entering into the bottom of the tube of construction material. The base also includes a feature on the outer surface of the base that is dimensioned to secure the elastic strap. The elastic strap has a length and an elasticity so that when inserted into the plurality of apertures in the construction material tube cap and into the feature on an outer surface of the base, the elastic strap forces the construction material tube cap down on the nozzle of the construction material tube when the elastic strap is connected to the base and the cap is fit over the nozzle of the construction material tube and the base is fit over the bottom of the construction material tube, thereby tightly sealing the nozzle.

19 Claims, 4 Drawing Sheets

(51) Int. Cl.
*B65D 47/12* (2006.01)
*B65D 47/14* (2006.01)

(58) Field of Classification Search
CPC ............ B05C 17/00506; B65D 47/121; B65D 47/141; B65D 47/12; B65D 47/148
USPC .................... 215/306; 220/315, 375; 222/546
See application file for complete search history.

(56) References Cited

U.S. PATENT DOCUMENTS

| | | | | |
|---|---|---|---|---|
| 2,893,613 | A | 7/1959 | Davis | |
| 2,898,019 | A | 8/1959 | Williams | |
| 3,223,269 | A * | 12/1965 | Williams ........... | B65D 41/0414 215/354 |
| 3,231,156 | A | 1/1966 | Schultz | |
| 3,275,179 | A | 9/1966 | Lux et al. | |
| 3,286,934 | A | 11/1966 | Schneller | |
| 3,301,453 | A * | 1/1967 | Stewart .................. | A45C 13/38 229/117.11 |
| 3,487,979 | A | 1/1970 | Altounyan et al. | |
| 3,520,453 | A * | 7/1970 | Stull .................... | B65D 47/242 222/542 |
| 3,731,848 | A | 5/1973 | Nakanishi | |
| 3,825,144 | A * | 7/1974 | Wiedmer ............. | B65D 41/185 215/320 |
| 3,930,599 | A | 1/1976 | Brothers et al. | |
| 3,985,268 | A | 10/1976 | Wood | |
| 4,154,366 | A | 5/1979 | Acres | |
| 4,210,253 | A | 7/1980 | Rosler | |
| D258,051 | S | 1/1981 | Bakus | |
| 4,422,788 | A | 12/1983 | Braithewaite et al. | |
| 4,643,380 | A * | 2/1987 | Copeland .................. | B65F 1/00 141/390 |
| 4,676,657 | A | 6/1987 | Botrie | |
| 4,735,509 | A | 4/1988 | Rausch | |
| 4,821,897 | A | 4/1989 | Weiler | |
| D300,973 | S * | 5/1989 | Copeland ......................... | D34/1 |
| 4,957,223 | A | 9/1990 | Beilush | |
| 5,127,534 | A * | 7/1992 | Fite, Jr. ................ | B65D 43/167 220/254.8 |
| 5,154,327 | A * | 10/1992 | Long ................. | B05C 17/00596 222/326 |
| 5,261,554 | A * | 11/1993 | Forbes ...................... | A45F 3/16 220/625 |
| 5,295,601 | A * | 3/1994 | Bostelman ............. | B65D 41/04 215/390 |
| 5,301,839 | A | 4/1994 | Eierle et al. | |
| 5,303,852 | A | 4/1994 | Yamawaki et al. | |
| 5,312,018 | A | 5/1994 | Evezich | |
| 5,678,729 | A | 10/1997 | Raymond | |
| 5,740,792 | A | 4/1998 | Ashley et al. | |
| 5,749,502 | A | 5/1998 | Hinds | |
| 5,960,998 | A | 10/1999 | Brown | |
| 6,095,352 | A * | 8/2000 | Lambert ................ | B65D 55/16 30/296.1 |
| 6,145,685 | A | 11/2000 | Dick | |
| 6,293,226 | B1 | 9/2001 | Hwang | |
| 6,364,163 | B1 | 4/2002 | Mueller | |
| 6,375,051 | B1 * | 4/2002 | Iverson ................ | B65D 47/121 222/327 |
| 6,481,597 | B1 | 11/2002 | Cermak, III | |
| 6,578,573 | B2 | 6/2003 | Koch | |
| 6,691,900 | B1 * | 2/2004 | Cermak, III ........ | B05C 17/0052 222/1 |
| 6,832,797 | B1 | 12/2004 | Gassel et al. | |
| 6,880,717 | B1 | 4/2005 | O'Conor | |
| 7,103,944 | B2 | 9/2006 | Johnson | |
| 7,308,993 | B2 | 12/2007 | Mineau | |
| 7,410,080 | B2 * | 8/2008 | Good ...................... | A45F 5/021 224/678 |
| 8,091,724 | B2 * | 1/2012 | King ...................... | B65D 51/28 215/331 |
| 8,342,351 | B2 * | 1/2013 | Hobbs, Sr. ........... | B65D 41/023 220/254.1 |
| 8,424,726 | B2 | 4/2013 | McClurg | |
| 8,459,487 | B2 | 6/2013 | Sharma | |
| 8,627,975 | B1 | 1/2014 | Whitbeck et al. | |
| 9,475,625 | B2 | 10/2016 | Di Molfetta | |
| 9,796,508 | B1 | 10/2017 | Rutherford | |
| 10,196,179 | B2 * | 2/2019 | Wisniewski ....... | B65D 41/3409 |
| 10,357,797 | B2 | 7/2019 | Coe | |
| 10,882,069 | B2 | 1/2021 | Coe | |
| 2001/0048198 | A1 | 12/2001 | Dulin | |
| 2002/0020718 | A1 | 2/2002 | Summons et al. | |
| 2002/0050275 | A1 | 5/2002 | Koch | |
| 2004/0065666 | A1 | 4/2004 | Walker | |
| 2005/0103790 | A1 | 5/2005 | Masso | |
| 2005/0211734 | A1 | 9/2005 | Spada et al. | |
| 2005/0230439 | A1 | 10/2005 | McKee | |
| 2007/0181573 | A1 | 8/2007 | Dawson et al. | |
| 2007/0227929 | A1 | 10/2007 | Mauerhan | |
| 2008/0128421 | A1 * | 6/2008 | Ulbrand ............. | B65D 81/3879 220/592.2 |
| 2008/0169289 | A1 | 7/2008 | Dawn | |
| 2009/0301990 | A1 * | 12/2009 | Cresswell .............. | B65D 41/28 220/23.88 |
| 2010/0140293 | A1 | 6/2010 | Dubach | |
| 2010/0155431 | A1 | 6/2010 | Bartolucci et al. | |
| 2010/0193549 | A1 | 8/2010 | Sirkis | |
| 2011/0011858 | A1 | 1/2011 | Vizl | |
| 2012/0085786 | A1 | 4/2012 | Mamiye | |
| 2012/0193376 | A1 | 8/2012 | Evans et al. | |
| 2013/0032241 | A1 | 2/2013 | Yamaguchi | |
| 2013/0082132 | A1 | 4/2013 | Gaul | |
| 2013/0134188 | A1 | 5/2013 | Terakawa | |
| 2014/0110432 | A1 | 4/2014 | Hanten et al. | |
| 2014/0138386 | A1 | 5/2014 | Blanchard | |
| 2014/0263319 | A1 | 9/2014 | Fazi et al. | |
| 2016/0158776 | A1 | 6/2016 | Sternberg et al. | |
| 2018/0044070 | A1 | 2/2018 | Coe | |
| 2018/0104714 | A1 | 4/2018 | Coe | |
| 2018/0178954 | A1 | 6/2018 | Haglof | |
| 2019/0299245 | A1 | 10/2019 | Coe | |
| 2020/0031546 | A1 * | 1/2020 | Griffin ................... | B65D 55/16 |

FOREIGN PATENT DOCUMENTS

| | | | |
|---|---|---|---|
| EP | 1452455 | A1 | 9/2004 |
| JP | 0516950 | A | 1/1993 |
| JP | H0516950 | A | 1/1993 |
| KR | 10-2001-0047398 | | 6/2001 |
| KR | 10-2010-0045288 | A | 5/2010 |
| KR | 10-20100045288 | A1 | 5/2010 |

* cited by examiner

VISCOUS CONSTRUCTION MATERIAL TUBE CAP AND STRAPPING APPARATUS

CROSS REFERENCE TO RELATED APPLICATION

The present application is a non-provisional application of U.S. Provisional Patent Application No. 62/965,478 entitled "Viscous Construction Material Tube Cap and Strapping Apparatus" filed on Jan. 24, 2020. The entire contents of U.S. Provisional Patent Application No. 62/965,478 are herein incorporated by reference. The present application is also related to U.S. Pat. No. 10,266,314, entitled "Construction Material Tube Strap Cap", issued on Apr. 23, 2019. The entire contents of U.S. Pat. No. 10,266,314 is also herein incorporated by reference.

Introduction

Various types of viscous materials, such as caulking material, sealants, and adhesive materials are commonly sold in standard cylindrical cartridges with standard nozzles that dispense the viscous material. These types of viscous materials are referred to herein as viscous construction materials or just construction materials. These standard cylindrical cartridges have a substantially rigid outer shell and the nozzle at one end. A moveable member or plunger device is typically located at the other end opposite to the nozzle. When the moveable member or plunger device is translated toward the nozzle, pressure builds up inside the cylindrical cartridge that forces the viscous construction material out of the nozzle.

Caulking guns comprise a class of construction and repair tools that expel viscous construction materials such as caulk, sealant or other fill material from these standard cylindrical cartridges for the purpose sealing and waterproofing joints that are likely to crack if filled with a rigid, non-flexible material. For example, during caulking, a bead of caulk is extruded from the caulking gun onto the desired location. Soon after the caulk has been applied, the user generally smooths and shapes the caulk with either his or her finger or one or more shaping tools. The user typically punctures the nozzle to form an opening through which the viscous construction materials pass, and the nozzle and opening are typically shaped to provide a suitable volume and dimension of material on the desired surface.

Numerous types of caulking guns have been developed over many decades that hold the cylindrical cartridges in place so that an actuator can actuate the moveable member or plunger device to cause a pressure build-up in the cylindrical tube that is sufficient to dispense the viscous materials out of the nozzle on demand. The first type of caulking gun is a bulk dispensing gun which is a complete unit unto itself, containing a closed cylindrical chamber or shell with nozzle and actuating means. For example, U.S. Pat. No. 2,587,683 to Barry discloses a disposable-type caulking gun that includes a tubular container that is adapted to carry an ejection key and a nozzle. The ejection key is threaded into the back of the container and is used to drive an internal plunger to expel the viscous material through the nozzle at one end of the cylindrical container.

The second type of caulking gun is one that has an open framed supporting structure with an actuating mechanism that is designed to be used with a separate cartridge that has its own nozzle and a moveable member or plunger device that cause a pressure build-up in the cylindrical tube that is sufficient to dispense the viscous materials on demand. This, more modern type of caulking gun, is designed to be used with a standard disposable cartridge. The use of disposable cartridges for dispensing many types of viscous construction materials is now very common. There are many hundreds of different types of disposable cartridges in an industry standard form factor that are commonly available today for dispensing numerous types of viscous construction materials. Many hardware stores have entire or nearly entire aisles filled with such disposable cartridges of viscous construction materials.

A more modern caulking gun that embodies this second type of caulking gun with an open framed supporting structure and an actuating mechanism that is used with a separate disposable cartridge is disclosed in U.S. Pat. No. 5,137,184 to Jackson et al. The Jackson caulking gun includes an open framework that has a forwardly disposed rim member and a rearwardly disposed trigger actuating mechanism operative on a piston. Some caulking guns with open-framed supporting structures use racketing-type actuating mechanisms.

A nozzle is removably mounted on the top rim of the gun and is also operatively connectable to a disposable cartridge which is inserted into the gun and cooperative with a piston to dispense caulking or other viscous construction materials through the nozzle. The nozzle has a cone-shaped configuration. In more recently manufactured caulking guns with disposable cartridges, the nozzle is integrated directly into the disposable cartridge.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
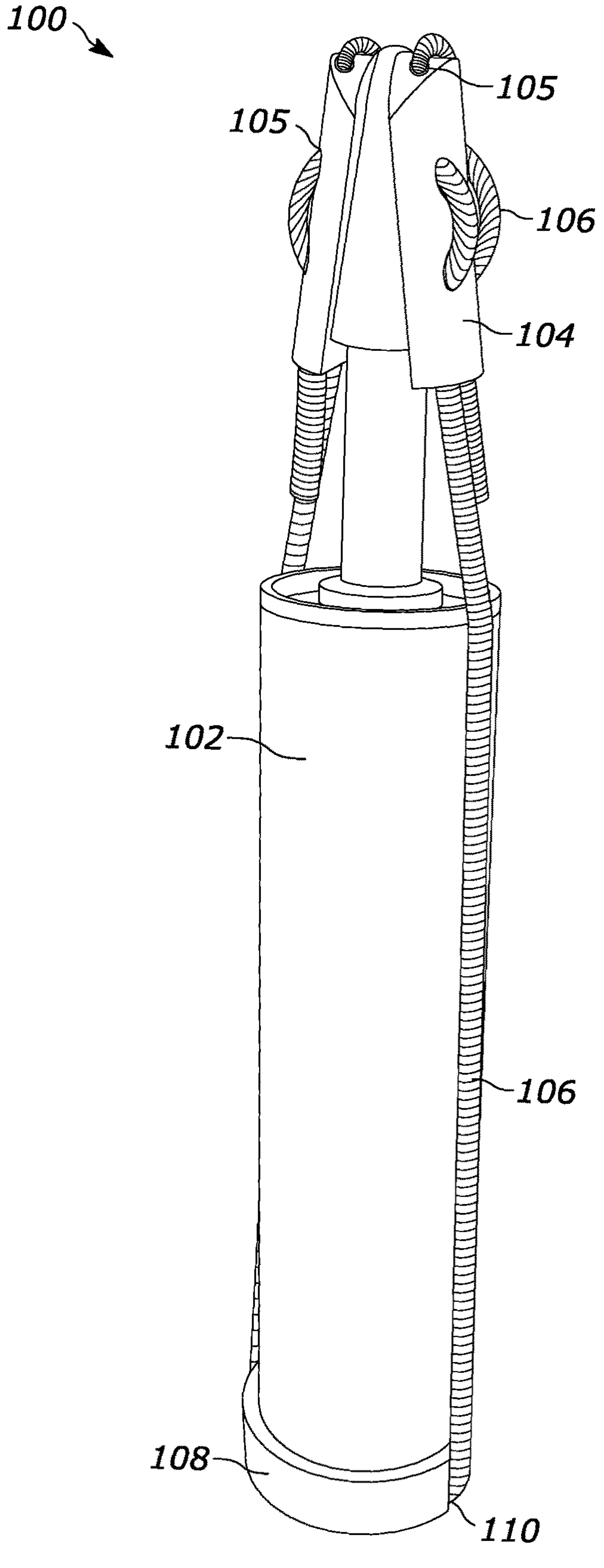
FIG. 1 illustrates a front view of a viscous construction material tube cap and strapping apparatus according to the present teaching positioned on a construction material tube so as to prevent construction material in an open tube from leaking and drying at both ends.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

It is well known that exposing viscous construction material to air will cause solvents in the viscous construction material to evaporate thus reducing the percentage of solvents in the viscous construction material. Reducing the percentage of solvents in the viscous construction material will increase the viscosity of the viscous construction material. An increase in viscosity increases the resistance to flow of the viscous construction material, thereby making it more difficult to expel the viscous construction material from the nozzle. Increasing viscosity also makes it more difficult to work with the viscous construction material in many construction applications. Eventually, the viscosity of the viscous construction material reaches a level that will clog the nozzle used to apply the construction material making it unusable. Even if the nozzle is cleared of the clog, the higher viscous construction material will quickly clog the nozzle again. Also, the higher viscous construction material will become unusable because it cannot be acceptably applied to the work surface. Typically, users will discard the tube once clogging occurs.

The time that it takes the viscous construction material to become unusable varies depending on many factors, such as the type of viscous construction material and solvents used in the viscous construction material, the details of the cylindrical tube construction, and the environmental conditions. However, the time that it takes the viscous construction material to become unusable is relatively short and can be a few hours to a few days depending on the various factors. Consequently, the casual user of viscous construction material typically gets only one, or a few, uses out of the standard cylindrical tube with a standard nozzle and cover. For many applications, this means that a large portion of the viscous construction material in the cylindrical tube is wasted because a large enough fraction of solvents evaporate before the remaining material is used.

Thus, one significant problem with the industry standard cylindrical disposable cartridges with nozzles that are widely used today is that, after their first use, they rapidly lose solvents and degrade to the point that they are not usable. For many casual users, the solvent instability results in the product being a single use product where much of the contents of the cylindrical disposable cartridge with nozzles are discarded.

Many industry standard cylindrical disposable cartridges come with a nozzle cover that fits over the nozzle after use for storage. Such nozzle covers are intended to prevent the viscous construction material from leaking as well as from being exposed to air. However, nozzle covers for cylindrical tubes of viscous construction material with nozzles typically do not provide a good seal to the nozzle so they leave enough air volume between the nozzle and the cover that allows some construction material leak outside the cap. Furthermore, in a relatively short time, the air volume between the nozzle and the cover dries out the construction material in the nozzle clogging the nozzle.

Many known nozzle covers have no mechanism or only a weak mechanism to secure them in place over the nozzle. As a result, prior art nozzle covers are notoriously leaky causing significant inconvenience to the user. For example, various prior art nozzle covers use a thin member that inserts down into the nozzle opening. These thin members easily become covered with the material, causing material loss and a mess when the nozzle cover is removed because the construction material is transferred out of the tube. Since most of the viscous construction materials are sticky materials and sometimes contain toxic materials, this leaking and external presence of material is highly undesirable. Leaked viscous construction materials often destroy clothing and tool bags and leave messy residues in vehicles and workshops that are difficult to clean up. This undesirable leaking can be exacerbated when environmental conditions, such as temperature and pressure, change. For example, leaving a cylinder of viscous construction material in a hot vehicle often exacerbates the leaking.

Some prior art nozzle covers utilize thin rubber balloons that are stretched over the tip of the nozzle. These prior art nozzle covers must be constructed from an elastic material that limits their integrity. The elastic material is prone to breakage if it is stretched to its limits. In addition, the elastic material is prone to getting pin-holes and larger tears that reduce the quality of the seal. The elastic material can also be structurally weakened by exposure to the construction materials. Another common limitation of prior art nozzle covers is that they do not extend fully to cover the entire length of the nozzle. This limits the strength of the seal that they provide. The more surface area of the inside of the cap that is in contact with the nozzle, the stronger the seal. The nozzle cap of the present teaching provides both a large area on the inside of the cap to cover the nozzle and to be in direct contact with the nozzle in order to produce a strong seal.

More recently, nozzle covers with better mechanisms to secure the nozzle cover in place over the nozzle have been developed. See, for example, U.S. Pat. No. 10,266,314 entitled "Construction Material Tube Strap Cap", which is assigned to the current assignee.

In addition to air leaking in through the nozzle, significant amounts of air leak into tubes of viscous construction material from the plunger at the base of the tube after the seal at the outer edge of the plunger is broken during the first use. Nozzle covers alone do not impede leakage of air into the tube of viscous construction material from the plunger. This lack of a seal at the plunger at the base of the tube causes solvent leaks and material leaks at both ends of the tube. One solution to mitigating air leakage at the base of the tube is to enclose the entire caulking tube in a container. See, for example, U.S. Pat. No. 10,351,307, entitled "Storage Container for Caulking Tube."

One aspect of the present teaching is the realization that the nozzle cap provided with many industry standard cylindrical disposable cartridges containing viscous construction materials is not effective in preventing solvent loss through the base of the tubes and that an improved nozzle cap with strapping apparatus can be used to both adequately secured to the nozzle of the cylindrical cartridge in a way that prevents significant amounts of air from drying the construction material exposed through the nozzle and also provide an air tight seal at the base of the tube, thereby preventing significant amounts of air from drying the construction material exposed through the base of the tube. The construction material tube strap cap of the present teaching can be used in connection with a nozzle that is connected to a disposable cartridge as well as a nozzle that is part of a caulking gun system. The term nozzle as used herein refers to either one or both of these types of nozzles and to other nozzles known in the art.

Another aspect of the present teaching is the realization that a practical solution to preventing air leakage into a tube of viscous construction material must be easy and quick to implement numerous time during the day while working on a project. It is common for users of viscous construction material to use the material intermittently during a work day. For example, it is common for users of viscous construction material, such a caulking, to caulk repeatedly during the day as surfaces become ready for treatment. Some known solutions are inconvenient for users to implement and, as a result, the tubes of tube of viscous construction material are exposed to air during long portions of the work day making the tubes unusable for more than one day.

FIG. 1 illustrates a front view of a viscous construction material tube cap and strapping apparatus 100 according to the present teaching positioned on a construction material tube 102 so as to prevent construction material in an open tube from leaking and drying at both ends. The construction material tube cap 104 is dimensioned and shaped to fit over the tip of the construction material tube 102. The construction material tube cap 104 also includes apertures 105, which are described in more detail in connection with FIG. 2, for an elastic strap 106 that is connected to the base 108.

In the embodiment shown in FIG. 1, the construction material tube cap 104 has a conical shape. Thus, when viewed from the top, the construction material tube cap 104 has a relatively small diameter at the top and a relatively larger diameter at the bottom. In some embodiments, the top and bottom of the construction material tube cap 104 are generally circular shape. The top and bottom of the body of the construction material tube strap cap 104 are dimensioned to provide a particular seal around the nozzle of the construction material tube 102. The top and bottom of the body of the construction material tube strap cap 100 are also dimensioned to provide a particular predetermined volume of air surrounding the nozzle of the caulking tube 102 enclosed by the body of the construction material tube strap cap 104. In some embodiments, the volume around the nozzle is very low or substantially zero.

One skilled in the art will appreciate that the body of the construction material tube strap cap 104 according to the present teaching can have many different shapes that are configured to fit over different nozzle shapes. In one particular embodiment, the top diameter of the construction material tube cap 104 is about 0.0881 inch and the bottom diameter of the construction material tube cap 104 is about 0.72 inch. In some embodiments, the top diameter and bottom diameter of the construction material tube cap 104 are dimensioned to allow the body of the construction material tube strap cap 104 to fit completely over a top nozzle of a standard construction material tube 102 such as a caulking tube. In some embodiments, the top radius and bottom radius of the construction material tube cap 104 are dimensioned to the fit over the top nozzle of a commercial caulking tube cartridge with a snug fit, such that the construction material tube strap cap 104 does not fall off the nozzle of the caulking tube 102 when inverted. In some embodiments, the bottom diameter of the caulking tube cap 104 is dimensioned such that the bottom of the body of the construction material tube strap cap 104 fits tightly on a lower portion of the nozzle to hold the cap in place, while the top diameter is dimensioned to fit loosely over the top portion of the nozzle.

The base 108 of the construction material tube cap and strapping apparatus 100 is dimensioned and shaped to fit tightly over the bottom of the construction material tube 102 so as to prevent the bottom of the construction material tube 102 from being exposed to air which can penetrate into the base of the construction material tube around the outer diameter of plunger and dry out the construction material, such a caulking material, at the bottom of the tube 102. Eventually, the air penetrating into the base of the construction material tube 102 around the plunger will dry out all of the construction material. The base 108 itself can include a gasket-type seal that positively seals the bottom of the construction material tube 102. For example, the base 108 can have an O-ring on at the inside outer edge that the seals the bottom of the construction material tube 102 as described further in connection with FIG. 3A.

The base 108 can include a physical structure 110 that is dimensioned to receive the elastic strap 106 so that it is tightly secured to the base 108. In some embodiments, the physical structure 110 is formed inside the base 108 so that the elastic strap 106 fits entirely into the base 108. In other embodiments, the physical structure 110 is formed partially inside the base 108, but not entirely within the base 108, so that the elastic strap 106 protrudes somewhat out of the base 108. In yet other embodiments, the physical structure 110 is formed on the outside of the base 108. In yet other embodiments, the physical structure can be an aperture or apertures that pass the elastic strap 106 so that the elastic strap 106 secures the caulking tube cap 104 to the base 108. For example, such apertures can be on the bottom of the base 108 or on opposite sides of the base 108. The elastic strap 106 positively connects the caulking tube cap 104 to the base 108 in a way where the caulking tube cap 104 is pulled into the nozzle of the caulking tube 102. In some embodiments, the bottom of the body of the construction material tube strap cap 104 is also pulled inward towards the center of the viscous construction material tube 102.

Figure 2:
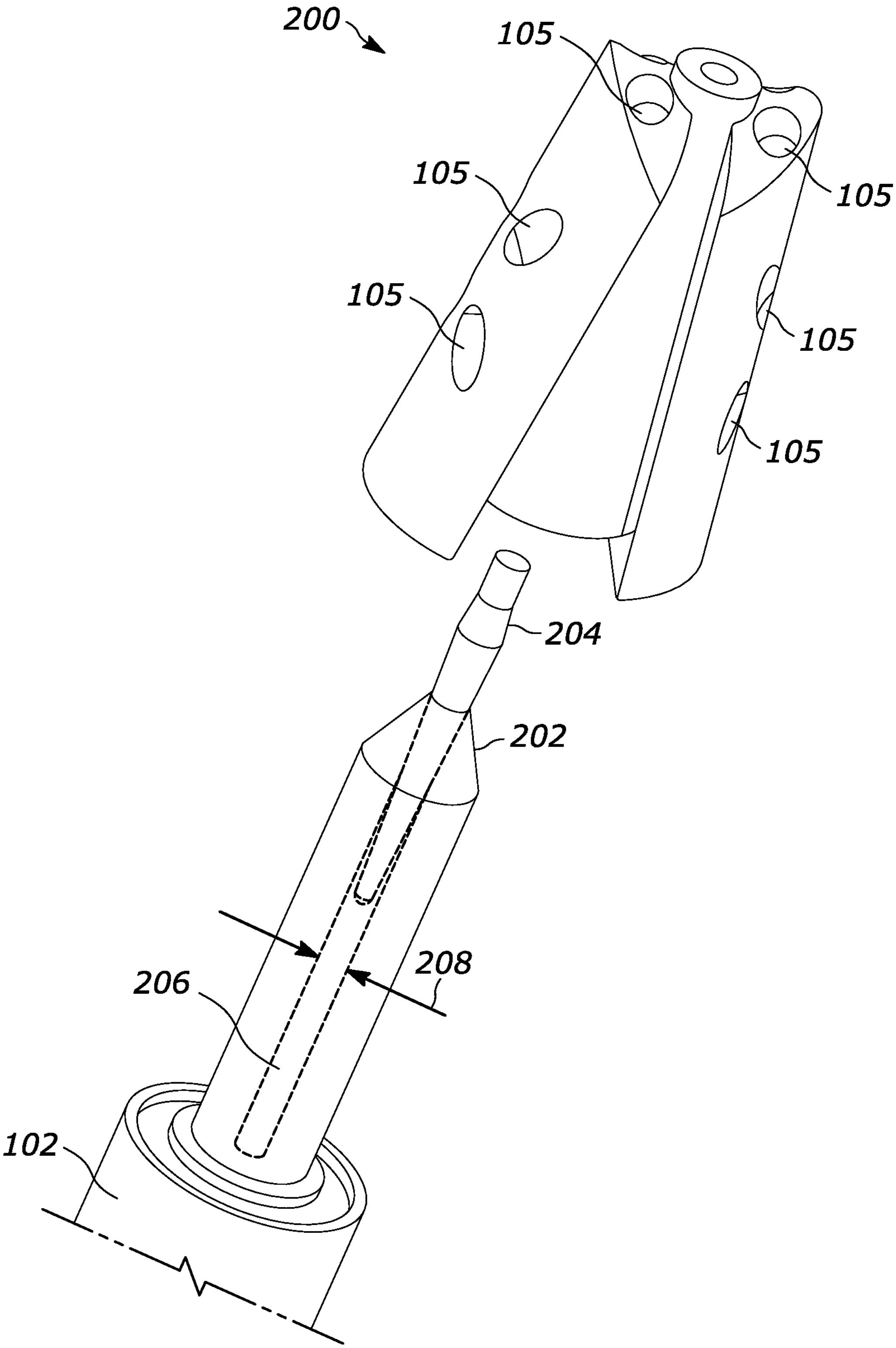
FIG. 2 illustrates a perspective view of an embodiment of the viscous construction material tube cap according to the present teaching that was described in connection with the viscous construction material tube cap and strapping apparatus of FIG. 1

FIG. 2 illustrates a perspective view of an embodiment of the viscous construction material tube cap 200 according to the present teaching that was described in connection with the viscous construction material tube cap and strapping apparatus of FIG. 1. Referring to both FIGS. 1 and 2, the construction material tube cap 200 defines apertures 105 for the elastic strap 106 to pass through. The apertures 105 are formed at angles relative to the center line of the construction material tube cap 200 that position the elastic strap when inserted into the apertures 105 in a manner that forces the construction material tube cap 200 down on the nozzle 202 when the elastic strap 106 is connected to the base 108, thereby tightly sealing the nozzle 202. There are many possible aperture configurations that will force the construction material tube cap 200 down on the nozzle 202 when the elastic strap 106 is connected to the base 108. The configuration shown is one example that is particularly effective in pulling the construction material tube cap 200 towards the center of the tube 102 tightly securing the construction material tube cap 200 to the nozzle 202.

In some embodiments, the caulking tube cap 200 is formed from plastic. For example, the caulking tube cap 200 can be formed of thermoplastic material including at least one of liquid crystalline polymer, polyethylene, polyamide, polycarbonate, polypropylene, polyphenylene sulfide, thermoplastic elastomer, copolyester elastomer, polystyrene, polyvinyl chloride, polytetraflouroethylene, and poly (methyl methacrylate). One skilled in the art will appreciate that numerous types of plastic materials having the desired mechanical and stability properties can also be used. Any of these plastic materials can be embedded with a colorant. Various other embodiments of the caulking tube cap 200 of the present teaching utilize one of numerous types of materials to form the caulking tube cap 200. For example, the caulking tube cap 200 can be formed of rubber or other pliable materials, depending on the particular application.

In some embodiments, the construction material tube cap 200 includes a plug 204 that is dimensioned to fit into an aperture 206 formed in the nozzle 202 of the standard cylindrical tube of viscous construction material 102 when opened by a user. The plug 204 is typically conically-shaped so that it can seal over a typical range of inner diameters 208 of the aperture 206. In one embodiment, the plug 204 is removably attached to the construction material tube cap 200. For example, the plug 204 can be configured to screw into the construction material tube cap 200. A removable plug 204 configuration is desirable for some construction materials because it allows the plug to be removed completely from the tube cap 200 so that it can be easily cleaned. Also, a removable plug configuration is desirable because it allows a wide variety of plugs sizes to be used depending upon the dimensions of the aperture 206 in the nozzle 202.

Figure 3A:
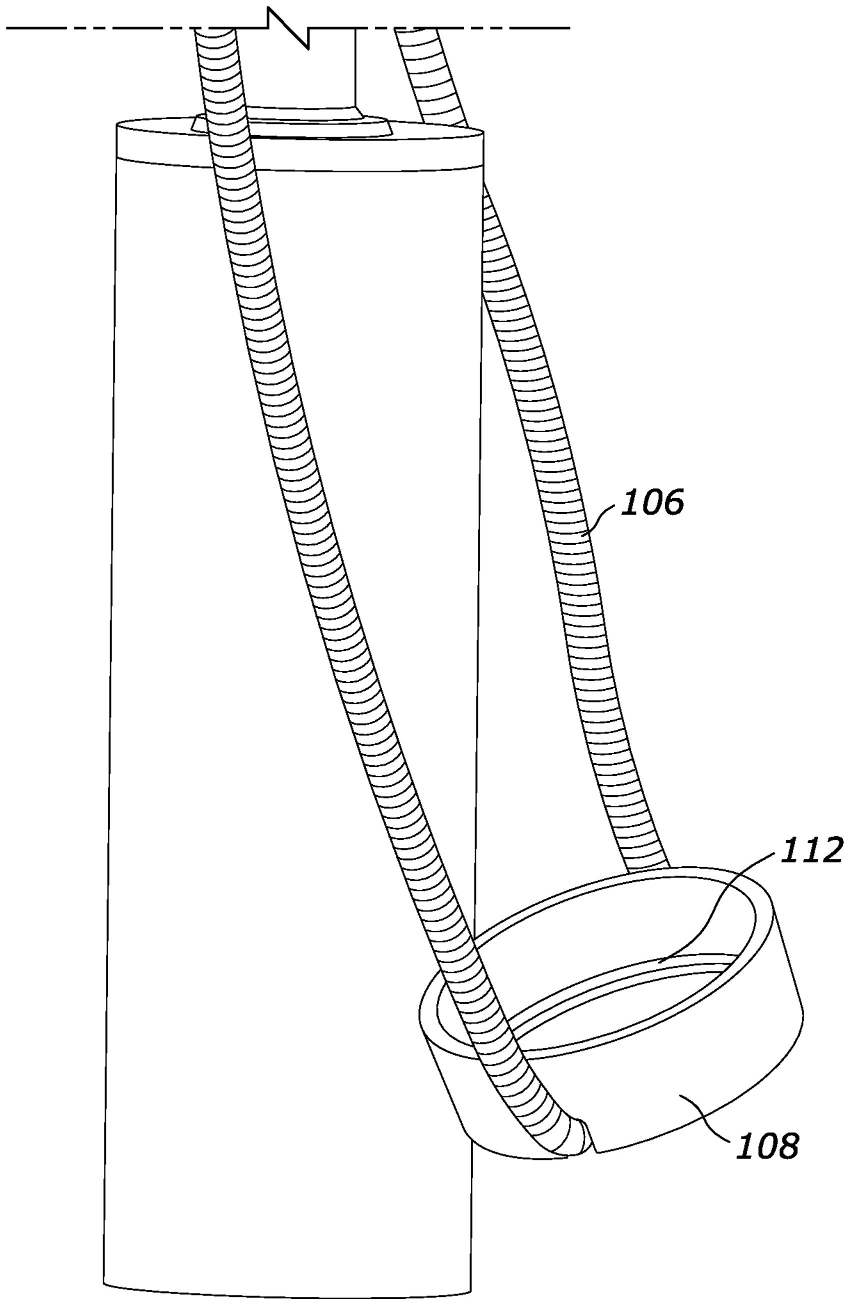
FIG. 3A illustrates a perspective view of the construction material tube cap and strapping apparatus with the base detached from the bottom of the tube.

FIG. 3A illustrates a perspective view of the construction material tube cap and strapping apparatus 100 with the base 108 detached from the bottom of the tube 102. The elastic strap 106 is positioned in a relaxed state where it is not stretched. The relaxed state of the elastic strap 106 positions the base 108 a distance above bottom of the tube 102. The physical structure 110 (FIG. 1) in the base 108 dimensioned to receive the elastic strap 106 is a groove or slot configured to receive the elastic strap 106. The groove shown in FIG. 3A is dimensioned so that when the elastic strap 106 is positioned in the groove, the elastic strap 106 is flush with the bottom surface of the base 108 so that when the caulking tube 106 with the construction material caulking tube cap and strapping apparatus 100 is in place on the tube 102, the entire structure can stand upright. In various other embodiments, the base 108 can include one or more features or an attachment point or points on the outer surface of the base that receives and secures the elastic strap 106 in order to hold the elastic strap in place.

The base 108 includes an O-ring groove that receives an O-ring 112. The O-ring 112 shown in FIG. 3A is a mechanical gasket with a round cross section. The O-ring can be formed of various materials such as PTFE, Nitrile (Buna), Neoprene, EPDM Rubber and Fluorocarbon (Viton). When the base 108 is positioned around the tube 102, the O-ring forms an air tight seal around the outer perimeter of the inside surface of the base 108 that prevents air from entering in through the base 108, which can pass through the outer edges of the plunger to inside of the tube of construction material causing the construction material to become less viscous and eventually making it unusable. The O-ring also prevents construction material from leaking out of the bottom of the tube and causing damage and inconvenience to the user.

Figure 3B:
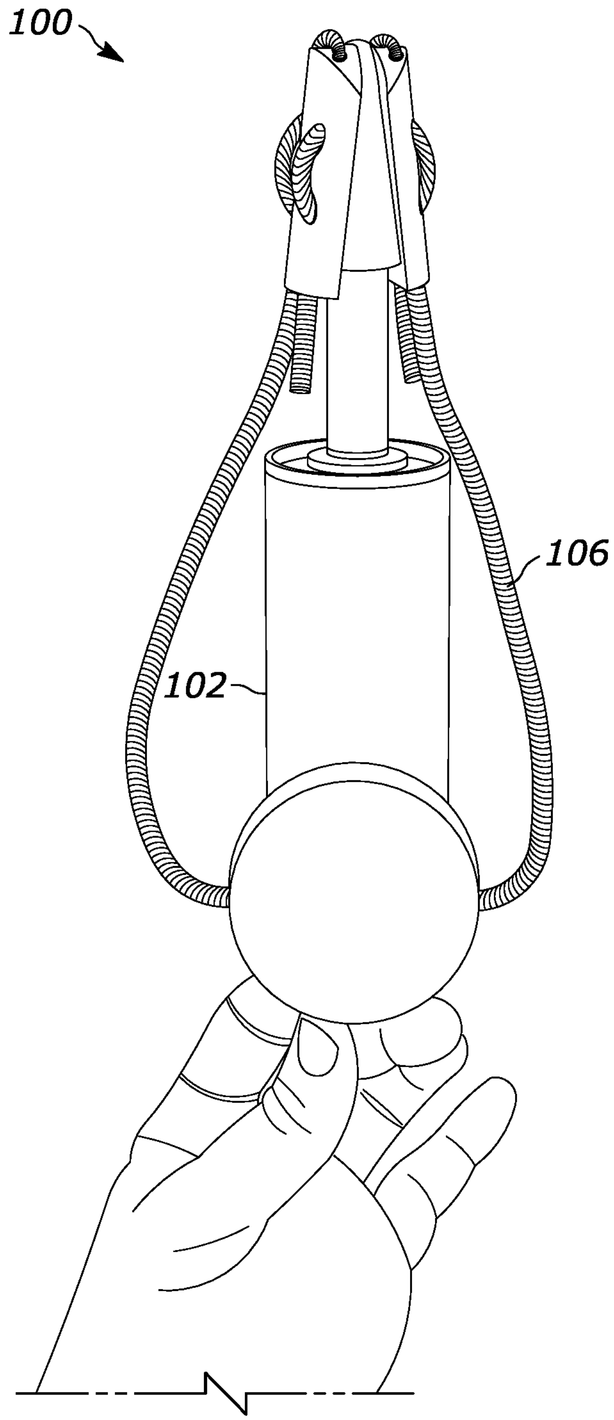
FIG. 3B illustrates a perspective view of the construction material tube cap and strapping apparatus with the base detached from the bottom of the tube and lifted up showing the bottom surface of the base.

FIG. 3B illustrates a perspective view of the construction material tube cap and strapping apparatus 100 with the base 108 detached from the bottom of the tube 102 and lifted up showing the bottom surface of the base 108. In the configuration shown in FIG. 3B, the bottom surface of the base 108 is flush so the tube 102 can be stood upright when the construction material tube cap and strapping apparatus 100 is positioned on the tube 102. The view shown in FIG. 3B also shows the flexible nature of the strap 106.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

We claim:

1. A construction material tube cap and strapping apparatus comprising:

an elastic strap;

the construction material tube cap fitting over a nozzle of a construction material tube, the construction material tube cap having a cap top with a first diameter and a cap bottom having a second diameter, the first diameter being smaller than the second diameter, the cap top seals the nozzle of the construction material tube with a plug extending internally from the cap top, and the cap bottom fits tightly on a lower portion of the nozzle to hold the construction material tube cap in place, the construction material tube cap being configured to define a plurality of apertures having dimensions for passing the elastic strap;

a base dimensioned to fit over a bottom of the construction material tube, the base comprising an air seal that prevents at least some air from entering into a bottom surface of the construction material tube, and comprising a feature on an outer surface of the base that is dimensioned to secure the elastic strap; wherein wherein the elastic strap has a length and an elasticity that when inserted into the plurality of apertures in the construction material tube cap and into the feature on the outer surface of the base, the elastic strap forces the construction material tube cap down on the nozzle of the construction material tube when the elastic strap is connected to the base and the cap is fit over the nozzle of the construction material tube and the base is fit over the bottom of the construction material tube, thereby tightly sealing the nozzle.

2. The construction material tube cap and strapping apparatus of claim 1 wherein the nozzle is threaded to receive the plug that is dimensioned to fit inside the nozzle of the tube of construction material.

3. The construction material tube cap and strapping apparatus of claim 1 wherein the construction material tube cap is formed of a thermoplastic material.

4. The construction material tube cap and strapping apparatus of claim 1 wherein an inner surface of the base comprises an O-ring grove.

5. The construction material tube cap and strapping apparatus of claim 4 further comprising an O-ring positioned in the O-ring grove that provides the air seal that prevents at least some air from entering into the bottom of the tube of construction material.

6. The construction material tube cap and strapping apparatus of claim 1 wherein an inner surface of the base comprises an O-ring that provides the air seal that prevents at least some air from entering into the bottom of the tube of construction material tube.

7. The construction material tube cap and strapping apparatus of claim 1 wherein an inner surface of the base comprises a gasket that provides the air seal that prevents at least some air from entering into the bottom of the tube of construction material tube.

8. The construction material tube cap and strapping apparatus of claim 1 wherein the feature on the outer surface of the base comprises a groove for receiving the elastic strap.

9. The construction material tube cap and strapping apparatus of claim 8 wherein the grove is dimensioned so that the elastic strap is presented flush against the outer surface of the base.

10. The construction material tube cap and strapping apparatus of claim 1 wherein the feature on the outer surface of the base comprises an aperture for receiving the elastic strap.

11. The construction material tube cap and strapping apparatus of claim 1 wherein the plurality of apertures defined by the construction material tube cap are defined in a shape relative to a center line of the construction material tube cap so the elastic strap forces the construction material tube cap inward towards the centerline when the elastic strap is attached.

12. A construction material tube cap and strapping apparatus comprising:

an elastic strap;

the construction material tube cap fitting over a nozzle of a construction material tube, the construction material tube cap having a cap top with a first diameter and a cap bottom having a second diameter, the first diameter being smaller than the second diameter, the cap top seals the nozzle of the construction material tube with a plug extending internally from the cap top, and the cap bottom fits tightly on a lower portion of the nozzle to hold the construction material tube cap in place, the construction material tube cap being configured to define a plurality of apertures having dimensions for passing the elastic strap;

the plug is conically-shaped and removably attached to the construction material tube cap and dimensioned to fit inside the open nozzle of the construction material tube; and a base dimensioned to fit over a bottom of the construction material tube, the base comprising an air seal that prevents at least some air from entering into a bottom surface of the construction material tube, and comprising a feature on an outer surface of the base that is dimensioned to secure the elastic strap; and wherein the elastic strap has a length and an elasticity that when inserted into the plurality of apertures in the construction material tube cap and into the feature on the outer surface of the base, the elastic strap forces the construction material tube cap down on the open nozzle of the construction material tube when the elastic strap is connected to the base and the cap is fit over the open nozzle of the construction material tube and the base is fit over the bottom of the construction material tube, thereby tightly sealing the open nozzle.

13. The construction material tube cap and strapping apparatus of claim 12 wherein the plug is positioned inside the construction material tube cap to centrally fit inside the open nozzle of the construction material tube.

14. The construction material tube cap and strapping apparatus of claim 12 wherein the plug is tapered away from a top of the construction material tube cap.

15. The construction material tube cap and strapping apparatus of claim 12 wherein an inner surface of the base comprises an O-ring that provides the air seal that prevents at least some air from entering into a bottom of the construction material tube.

16. The construction material tube cap and strapping apparatus of claim 13 wherein an inner surface of the base comprises a gasket that provides the air seal that prevents at least some air from entering into a bottom surface of the construction material tube.

17. The construction material tube cap and strapping apparatus of claim 12 wherein the feature on the outer surface of the base comprises a groove for receiving the elastic strap.

18. The construction material tube cap and strapping apparatus of claim 12 wherein the feature on the outer surface of the base comprises an aperture for receiving the elastic strap.

19. The construction material tube cap and strapping apparatus of claim 1 wherein the plug of the construction material tube cap is configured to screw into an aperture formed in the nozzle of the construction material tube.

* * * * *